(12) United States Patent
Bryan et al.

(10) Patent No.: US 12,347,893 B2
(45) Date of Patent: Jul. 1, 2025

(54) BATTERY PACK

(71) Applicant: TECHTRONIC CORDLESS GP, Anderson, SC (US)

(72) Inventors: Frederick W. Bryan, Greenville, SC (US); Blake Strickland, Anderson, SC (US); Michael MacQuillan Thompson, Anderson, SC (US); Michael Nemshon, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 958 days.

(21) Appl. No.: 17/478,623

(22) Filed: Sep. 17, 2021

(65) Prior Publication Data

US 2023/0089745 A1 Mar. 23, 2023

(51) Int. Cl.
| | |
|---|---|
| *H01M 50/583* | (2021.01) |
| *H01M 10/653* | (2014.01) |
| *H01M 10/658* | (2014.01) |
| *H01M 50/213* | (2021.01) |
| *H01M 50/264* | (2021.01) |
| *H01M 50/284* | (2021.01) |

(52) U.S. Cl.
CPC ....... *H01M 50/583* (2021.01); *H01M 10/653* (2015.04); *H01M 10/658* (2015.04); *H01M 50/213* (2021.01); *H01M 50/264* (2021.01); *H01M 50/284* (2021.01)

(58) Field of Classification Search
CPC ............. H01M 10/658; H01M 10/653; H01M 50/284; H01M 50/213; H01M 50/264; H01M 50/583
See application file for complete search history.

(56) References Cited

U.S. PATENT DOCUMENTS

| | | | |
|---|---|---|---|
| 7,972,721 B2 | 7/2011 | Kozu et al. | |
| 8,475,954 B2 | 7/2013 | Ijaz et al. | |
| 8,615,869 B2 | 12/2013 | Chattot | |
| 8,659,270 B2 | 2/2014 | Hermann et al. | |
| 9,118,192 B2 | 8/2015 | Zhu et al. | |

(Continued)

FOREIGN PATENT DOCUMENTS

| | | |
|---|---|---|
| CN | 210607448 U | 5/2020 |
| CN | 112490595 A | 3/2021 |

(Continued)

OTHER PUBLICATIONS

3M, "Single Side Adhesive Thermal Pad 100 x 100 x" <https://www.amazon.com/gp/product/B08PS38SPR/ref=ppx_yo_dt_b_asin_title_000_s00?ie=UTF8&psc=1> web page visited Jun. 14, 2021.

(Continued)

*Primary Examiner* — Sarah A. Slifka
(74) *Attorney, Agent, or Firm* — Michael Best & Friedrich LLP

(57) ABSTRACT

A battery pack includes a housing and a plurality of battery cells. A printed circuit board is supported within the housing and is electrically coupled to a plurality of electrical terminals configured to mate with a plurality of electrical terminals of the device. A cell strap in electrical communication with at least one of the plurality of battery cells and in electrical communication with the printed circuit board. A fuse is coupled to the printed circuit board. A heat shield is coupled to the fuse. The heat shield is configured to inhibit heat transfer between the fuse and other components of the battery pack.

20 Claims, 8 Drawing Sheets

(56) References Cited

U.S. PATENT DOCUMENTS

| | | |
|---|---|---|
| 9,184,430 B2 | 11/2015 | Kalman |
| 10,511,069 B2 | 12/2019 | Krämer |
| 10,910,623 B2 | 2/2021 | Krämer |
| 2017/0338535 A1 | 11/2017 | Bhoir |
| 2019/0198953 A1 | 6/2019 | Krämer |
| 2019/0260004 A1 | 8/2019 | Krämer |
| 2019/0372085 A1 | 12/2019 | Yang et al. |
| 2020/0076022 A1 | 3/2020 | Kawakami et al. |
| 2021/0029846 A1 | 1/2021 | Revankar et al. |

FOREIGN PATENT DOCUMENTS

| | | |
|---|---|---|
| CN | 212967963 U | 4/2021 |
| CN | 213071053 U | 4/2021 |
| EP | 2731172 B1 | 10/2019 |
| WO | 2018096926 A1 | 5/2018 |
| WO | 2019001193 A1 | 1/2019 |
| WO | 2020102235 A1 | 5/2020 |

OTHER PUBLICATIONS

Extended European Search Report for Application No. 22196029.7 dated Feb. 9, 2023 (7 pages).

BATTERY PACK

BACKGROUND

The present disclosure relates to a battery pack. Newer battery packs have increased current limits compared to conventional battery packs. The increased current limits increase the heat generated inside of the battery pack. Accordingly, components of the battery pack need protection from the increased heat to improve longevity of the battery pack and components.

SUMMARY

In one embodiment, a battery pack includes a housing and a plurality of battery cells. A printed circuit board is supported within the housing and is electrically coupled to a plurality of electrical terminals configured to mate with a plurality of electrical terminals of the device. A cell strap in electrical communication with at least one of the plurality of battery cells and in electrical communication with the printed circuit board. A fuse is coupled to the printed circuit board. A heat shield is coupled to the fuse. The heat shield is configured to inhibit heat transfer between the fuse and other components of the battery pack.

In another embodiment, a battery pack includes a housing and a plurality of battery cells supported within the housing. A printed circuit board is supported within the housing and is electrically coupled to a plurality of electrical terminals configured to mate with a plurality of electrical terminals of a device. A cell strap in electrical communication with at least one of the plurality of battery cells and in electrical communication with the printed circuit board. A fuse is coupled to the printed circuit board. A heat shield is proximate the fuse. A thermally conductive pad is positioned within the housing.

In another embodiment, a method of manufacturing a battery pack includes positioning a plurality of battery cells and a printed circuit board within a housing, coupling a cell strap between at least two of the plurality of cells, coupling a fuse between the cell strap and the printed circuit board, and coupling a heat shield to the fuse.

Other aspects will become apparent by consideration of the detailed description and accompanying drawings.

DETAILED DESCRIPTION

Figure 1:
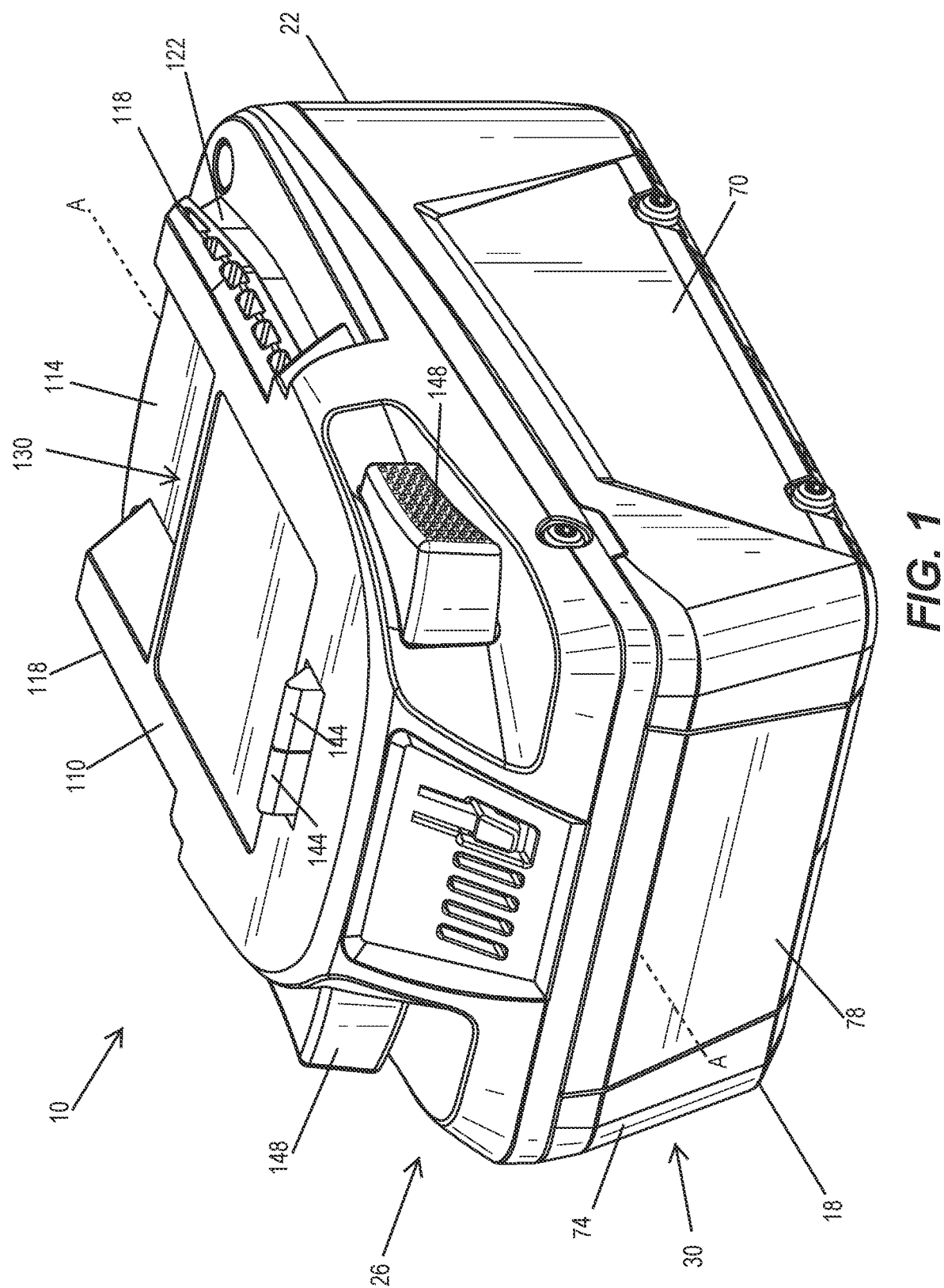
FIG. 1 is a perspective view of a battery pack including a housing.

Before any embodiments are explained in detail, it is to be understood that the invention is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, whether direct or indirect.

FIGS. 1-4 illustrate a slidable-type battery pack 10 that is capable of being removably and electronically coupled to a power consuming device (e.g., a power tool (not shown) or a charger (not shown)). The battery pack 10 includes a housing having a longitudinal axis A that extends between a first end 18 and a second end 22. The battery pack housing includes a first housing portion 26 (e.g., a top housing) coupled to a second housing portion 30 (e.g., a bottom housing). In the illustrated embodiment, the housing encloses an inner cavity that includes the inner components of the battery pack 10 including a plurality of battery cells 40, a plurality of cell straps 50a-50e, a printed circuit board 60 including a battery pack controller, and heat mitigating elements, which will be discussed in greater detail below. Each of the plurality of cell straps 50a-50e are in electrical communication with at least two of the plurality of battery cells 40 and the printed circuit board 60.

As shown in FIG. 1, the bottom housing 30 includes a first sidewall 70, a second sidewall 74, and a battery cell holder 78 that is positioned between the first and second sidewalls 70, 74. In the illustrated embodiment, the battery cell holder 78 at least partially defines the bottom housing 30. That is, the battery cell holder 78 defines a wall (e.g., a bottom wall) of the bottom housing 30. Moreover, the battery cell holder 78 may further include a support surface 82 (FIG. 4) that is opposite the bottom wall of the bottom housing 30 and a plurality of battery receiving sections 86 (FIG. 4), each configured to support one of the plurality of battery cells 40. In other embodiments, the battery cell holder 78 may be separate from the bottom housing 30 and positioned within the inner cavity. The printed circuit board 60 may be supported by the support surface 82 of the battery cell holder 78. As shown, the printed circuit board 60 includes a cut-out 90 in the perimeter thereof.

Figure 2:
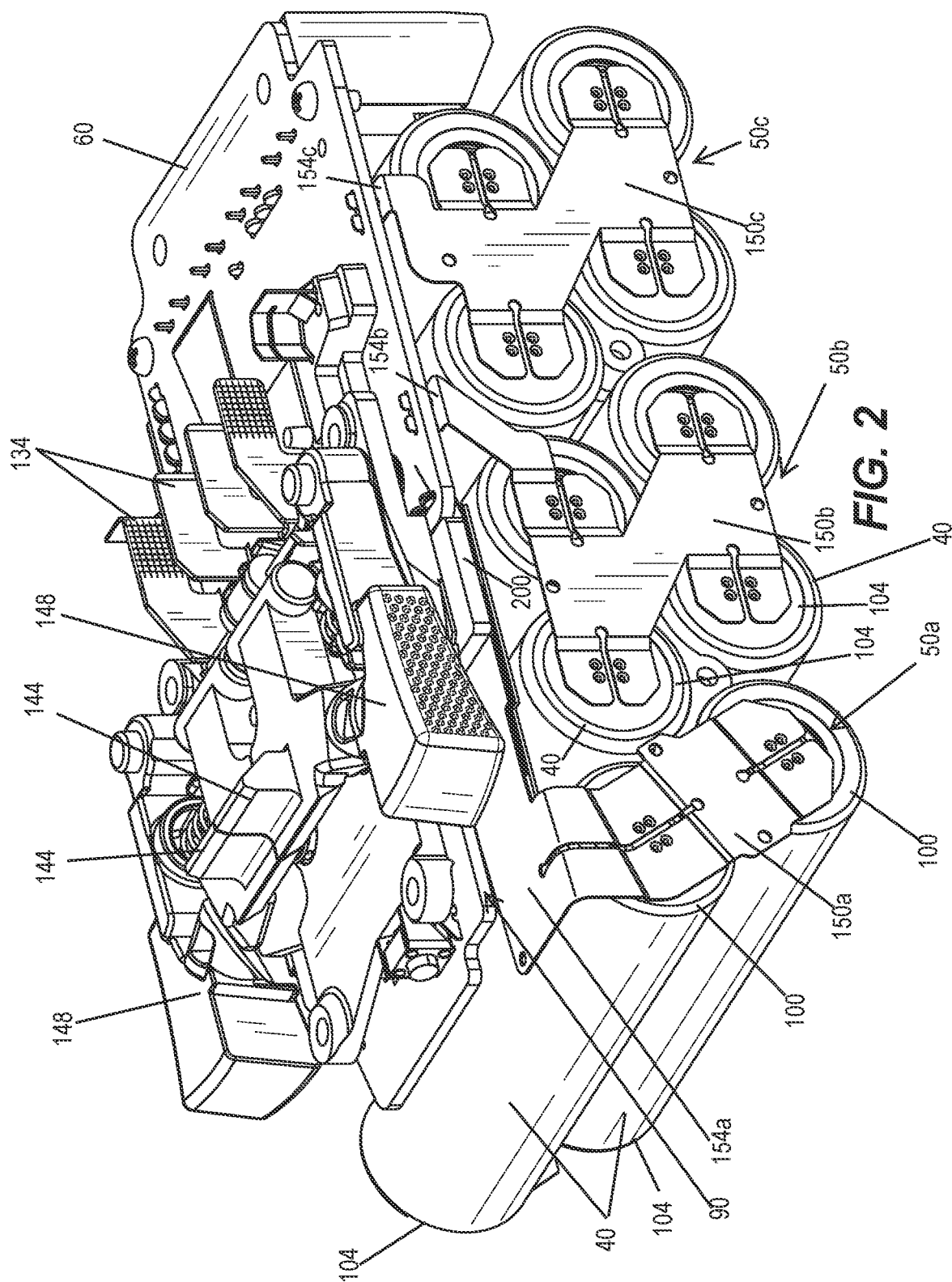
FIG. 2 is a perspective view of the battery pack of FIG. 1 with a portion of the housing removed.
Figure 3:
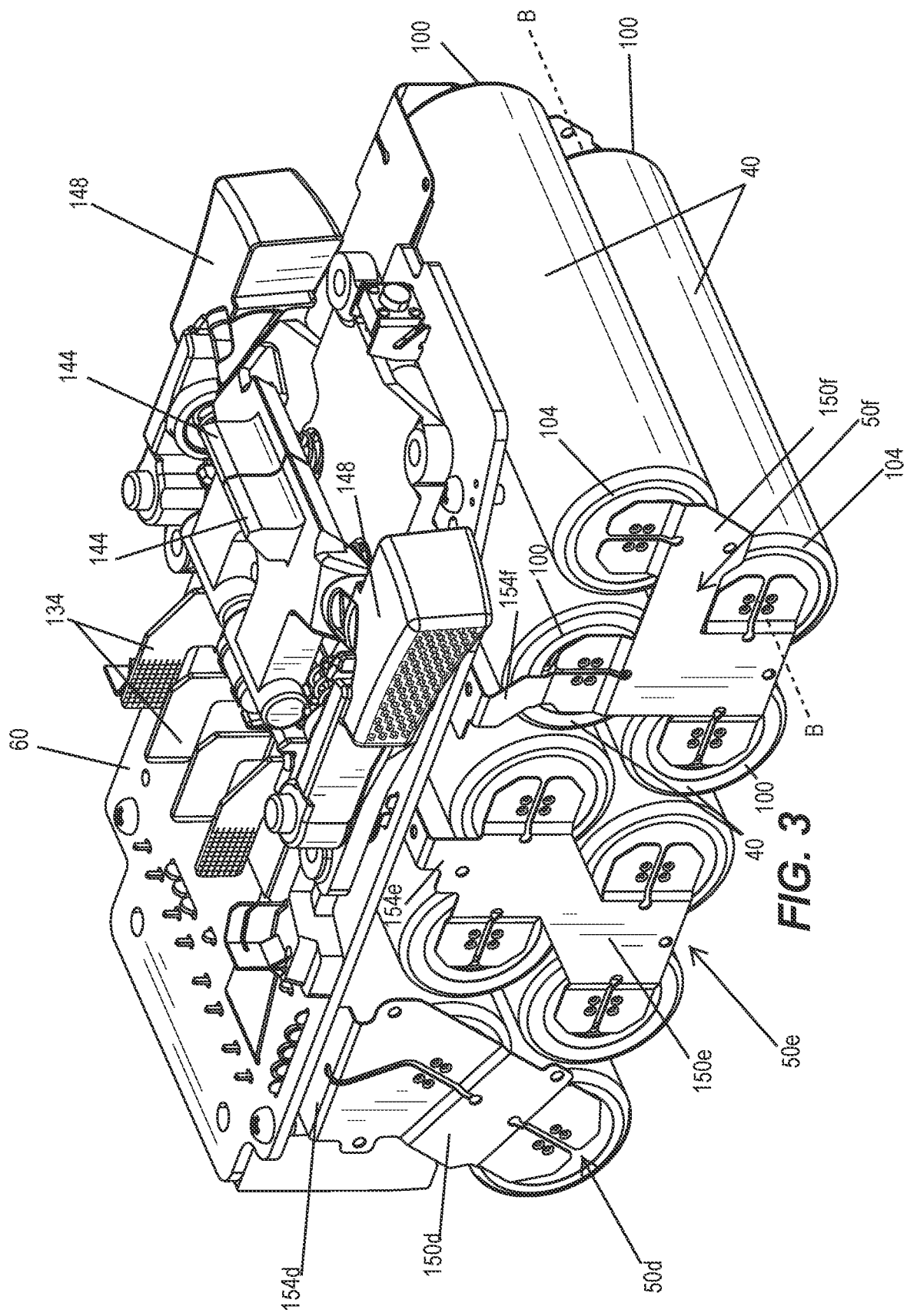
FIG. 3 is another perspective view of the battery pack of FIG. 1 with a portion of the housing removed.
Figure 4:
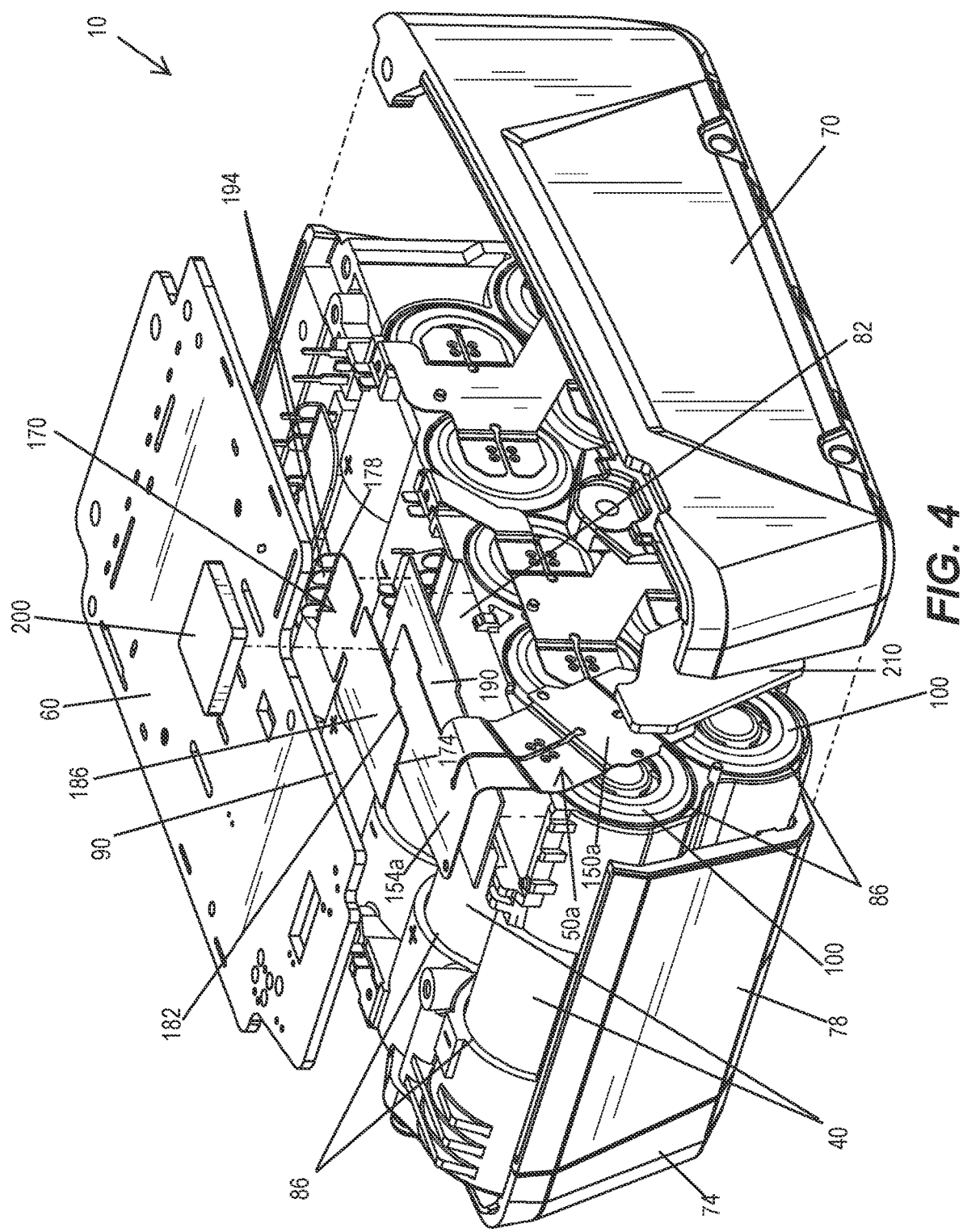
FIG. 4 is a partial exploded view of the battery pack of FIG. 1.

In the illustrated embodiment, shown in FIGS. 2-4, each of the plurality of battery cells 40 includes a first end 100 that has a first terminal (e.g., a positive terminal), a second end 104 that has a second terminal (e.g., a negative terminal), and a longitudinal axis B (FIG. 3) extending between the first end 100 and the second end 104. As shown, the longitudinal axes B of each of the plurality of battery cells 40 is oriented perpendicular to the longitudinal axis A of the battery pack. That is, as shown, one of the first and second ends 100, 104 of each of the battery cells 40 is positioned adjacent the first sidewall 70 and the other of the first and second ends 100, 104 of the battery cells 40 is positioned adjacent the second sidewall 74.

Referring again to FIG. 1, the top housing 26 includes a battery pack interface that is physically couplable to a complementary interface of the power tool or a charger. The interface includes a first surface 110 (e.g., top surface) and a second surface 114 (e.g., intermediate surface). A pair of rails 118 and a pair of channels 122 extend along opposite sides of the interface parallel to the longitudinal axis A. In particular, the channels 122 are defined between the respective rails 118 and the intermediate surface 114.

A terminal block 130 extends between the top surface 110 and the intermediate surface 114. The terminal block 118 includes openings (not shown). Electric terminals 134 (FIG. 3) are positioned within the housing and configured to engage the electrical terminals of the power tool for the battery pack 10 to electrically power the power tool. In particular, each of the electrical terminals 134 of the battery pack 10 is aligned with one of the openings of the terminal block, and when coupled to the power tool, each of the electrical terminals of the power tool extends into the openings to engage the electrical terminals 134 of the battery pack 10. In the illustrated embodiment, the electrical terminals 134 of the battery pack are male terminals. In other or additional embodiments, the electrical terminals 134 of the battery pack 10 may be female terminals. The electrical terminals 134 are supported by and electrically coupled to the printed circuit board 60 and electrically coupled to the battery cells 40 and battery pack controller.

The battery pack 10 may include a latch mechanism that has one or more latch members 144 and one or more latch actuators 148. In the illustrated embodiment, the latch mechanism includes a first latch member 144 that is movable relative to the housing by a first latch actuator 148 and a second latch member 144 that is movable relative to the housing by a second latch actuator 148. In a latched position, the first and second latch members 144 extend from top surface 110 of the housing 114, and the first and second latch actuators 148 positioned on opposite sides of the interface and are biased away from the housing. In the unlatched position, a force imparted by a user on each of the first and second latch actuators 148 in a direction towards the longitudinal axis A, depresses the first and second latch members 144 such that they are at least partially recessed relative to the top surface and at least partially positioned within the inner cavity. In other embodiments, the latch mechanism may have other configurations.

Internal components of the battery pack 14 are shown in FIGS. 2-4. In the illustrated embodiment, each cell strap 50*a*-50*f* is in electrical communication between at least two battery cells 40 and the printed circuit board 60. More specifically, each cell strap 50*a*-50*e* includes a battery connection part 150*a*-150*f* and a coupling part 154*a*-154*f*. In other embodiments (for example, for a 1P battery pack), the cell strap may connect one battery cell 40 to the printed circuit board 60. Each of the battery connection parts 150*a*-150*f* is coupled (e.g., welded, soldered, and/or the like) to the terminals of the battery cells 40. Each of the coupling parts 154*a*-154*f* extends from the respective battery connection part 150*a*-150*f* and is coupled to the printed circuit board 60. At least a portion of the coupling part 154*a*-154*f* of each of the battery cell straps 50*a*-50*f* are supported by the support surface 82 of the battery cell holder 78. Each of the battery cell straps 50*a*-50*f* is formed from one or more electrically conductive materials. Examples of electrically conductive materials may include but are not limited to, copper, copper alloy, nickel, or aluminum. Moreover, in some embodiments, the battery cell straps 50*a*-50*f* may further include a layer of metal plating formed on at least a portion thereof, such as copper plating or tin plating. As shown, in the illustrated embodiment, there are six cell straps 50*a*-50*f*—three on each side of the battery pack 14. Two of the cell straps 50*b*, 50*c*, 50*e*, 50*f* on each side are coupled to four battery cells 40 and one cell strap 50*a*, 50*c* on each side is coupled to only two battery cells 40. Moreover, all but one of the cell straps 50*b*-50*f* may be directly electrically coupled to the printed circuit board 60.

In the embodiment illustrated in FIG. 4, one of the cell straps 50*a* (hereinafter referred to as "the cell strap") is coupled to the printed circuit board 60 by a fuse 170 (e.g., a fuse bridge, FIG. 4). The fuse 170 includes a first end 174, a second end 178 opposite the first end 174, a first surface 182, and a second surface 186 opposite the first surface 182.

The fuse 170 may have a substantially uniform thickness along its length between the first end 174 and the second end 178. That is, in other embodiments, the fuse 170 may have a variable thickness along its length. The fuse 170 may include a variable width. A width between the first and second ends 170, 174 of the fuse 170 may be narrower or smaller than a width on each of the first and second ends 170, 174. The fuse 170 may be supported by the support surface 82 of the battery cell holder 78 adjacent to the printed circuit board 60. In particular, the first surface 182 of the fuse 170 faces the battery cell holder 78. In some embodiments, the fuse 170 (e.g., the first surface 182 of the fuse 170) may be coupled directly to the battery cell holder 78. In other embodiments, the fuse 170 may be positioned elsewhere within the housing of the battery pack 10. For example, the fuse 170 may be supported on and coupled to the printed circuit board 60. Alternatively, the fuse may be positioned between two cell terminals.

Figure 5:
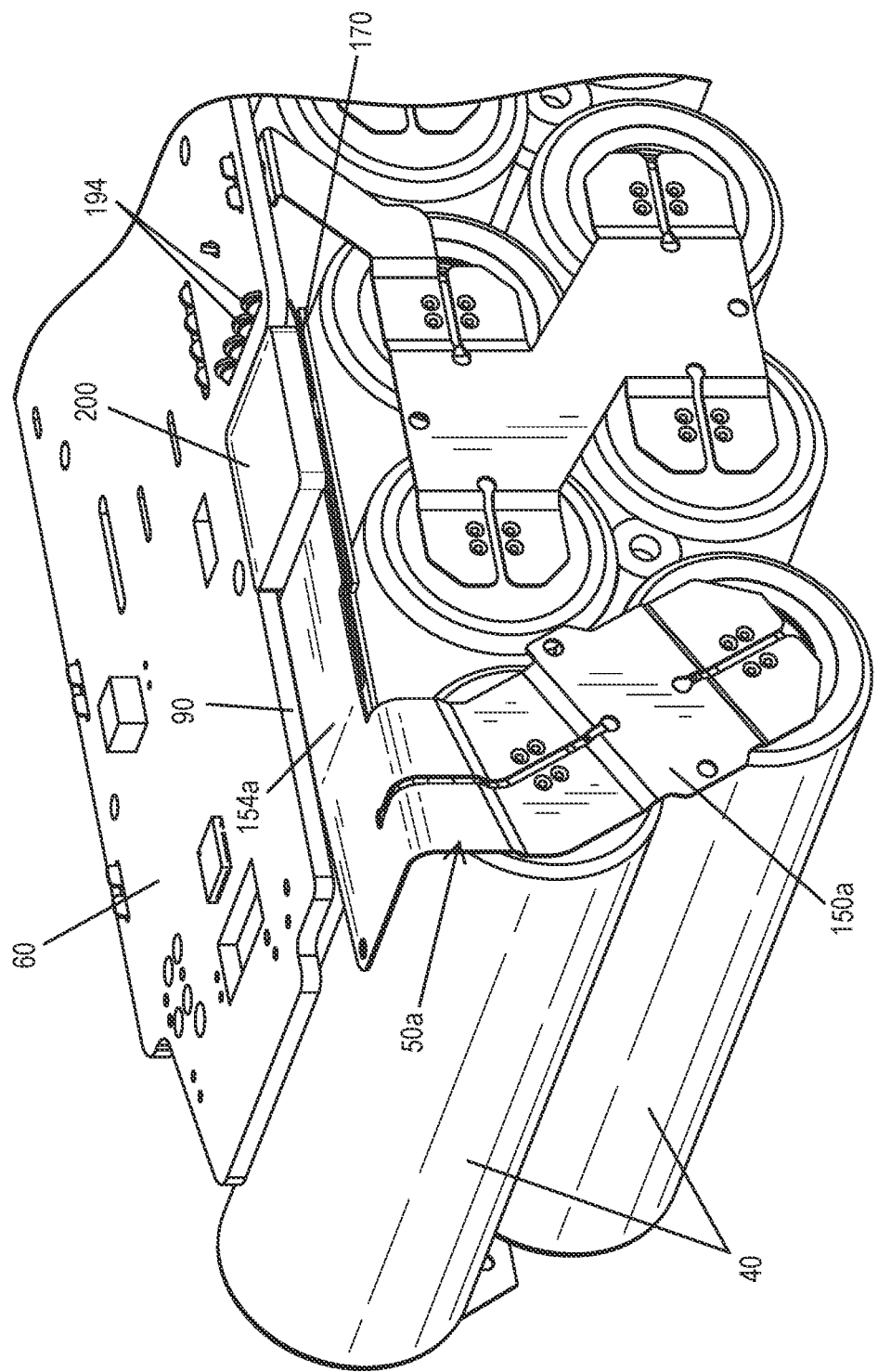
FIG. 5 is a perspective view of a portion of the battery pack with the housing removed.

In the embodiment illustrated in FIGS. 4 and 5, the cell strap 50*a* and the fuse 170 constitute a two-piece cell strap. In the illustrated embodiment, the cell strap 50*a* and the fuse 170 are formed from (or otherwise include) different electrically conductive materials. For example, the cell strap 50*a* may be formed from (or otherwise include) copper, while the fuse 170 may be formed from (or otherwise include) a copper alloy. In other embodiments, however, the cell strap 50*a* and the fuse 170 may be formed from (or otherwise include) other electrically conductive materials.

The fuse 170 may be formed from (or otherwise include) any electrically conductive material, such as, but not limited to, copper, copper alloy, nickel, or aluminum. In some embodiments, the fuse 170 may further include a layer of metal plating formed on at least a portion thereof, such as copper plating or tin plating. In some embodiments, the electrically conductive material of the fuse 170 may be a homogenous material, meaning that the material is of uniform composition throughout and cannot be mechanically disjointed into different materials. That is, in some embodiments, the fuse may be formed from only copper, copper alloy, nickel, or aluminum. In some embodiments, the fuse 170 may be formed from (or otherwise include) a heterogenous electrically conductive material (i.e., the material is not uniform in composition throughout and may be mechanically disjoined into different materials). For example, in some embodiments, the fuse 170 may be a multi-layer heterogeneous fuse and may include one or more layers of electrically conductive materials, which may be the same or different from one another. Multi-layer heterogeneous fuses may add desirable fusing characteristics (e.g., may change the current vs. blow-time curves). In another example, the fuse 170 may be a heterogeneous fuse that has the fusing element (e.g., a metal wire or wire formed from another electrically conductive material) contained in a protective capsule (e.g., glass, ceramic, sand in a tube).

Figure 6:
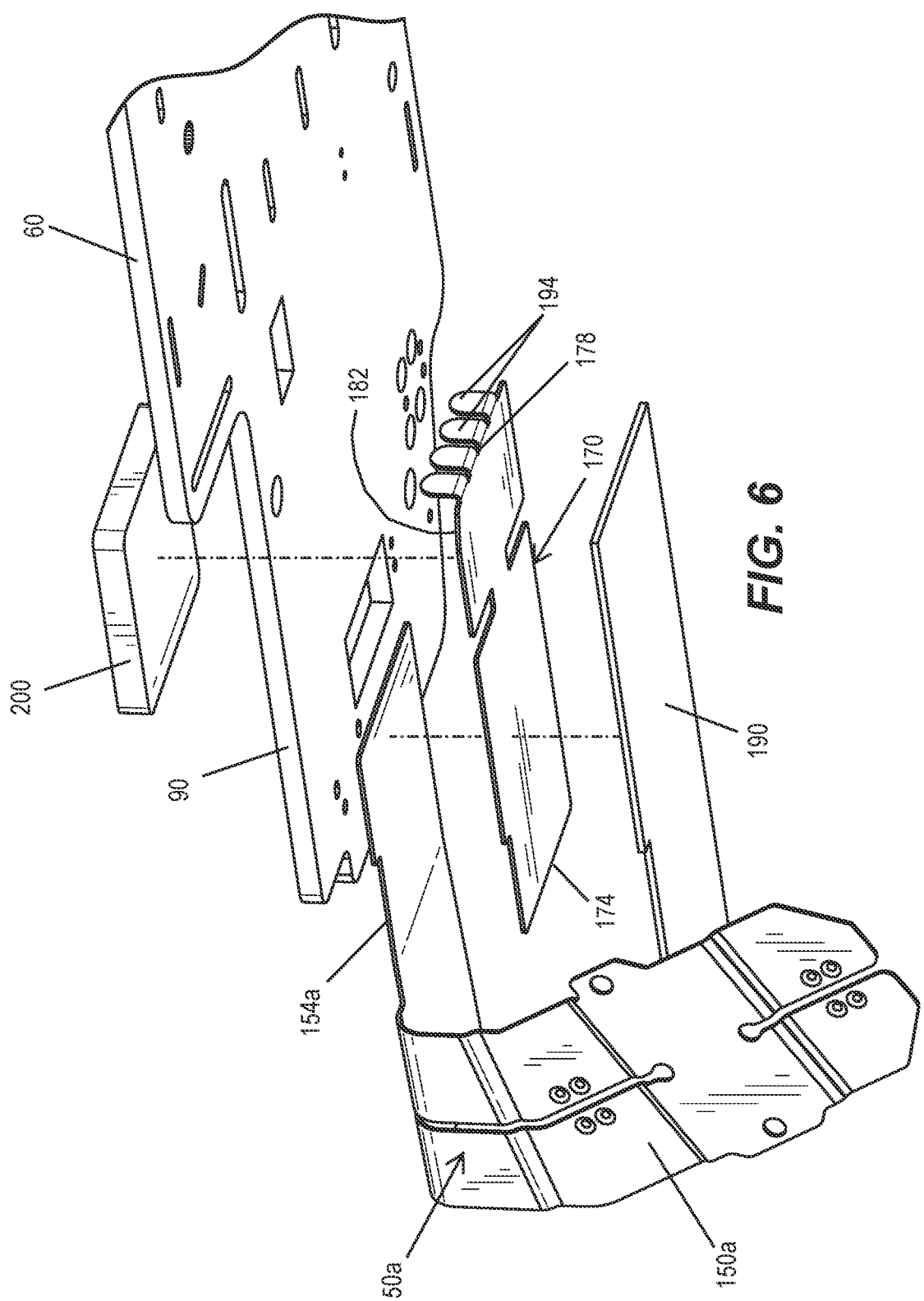
FIG. 6 is an exploded view of a printed circuit board, a cell strap, a heat shield, a fuse, and an insulation member.

As shown in FIG. 6, an electrically insulating and thermally conductive material 190 (e.g., an electrically insulating and thermally conductive layer) is positioned between at least a portion the battery cell holder 78 and the fuse 170.

Specifically, the fuse 170 (e.g., the first surface 182 of the fuse 170) is coupled to an insulation material 190. In the illustrated embodiment, the insulation material 190 may be a sheet formed of mica (e.g., a mica sheet). In other embodiments, the insulation material 190 may be formed of other electrically insulating and thermally conductive materials, such as, but not limited, to Kapton tape, heat-resistant woven materials (e.g., fiberglass and silicone coated fiberglass), metal foils (e.g., aluminum foil, copper foil, etc.) or a combination thereof.

As shown in FIGS. 5 and 6, a portion of the connecting part the cell strap 50a is coupled (e.g., by adhesive or fasteners) to the first surface 182 of the fuse 170. That is, a portion of the connecting part 154 of the cell strap 50a overlaps the first end 174 of the fuse 170. The second end 178 includes projections 194 extending from the second surface 186 that are received in apertures in the printed circuit board 60. The projections 194 electrically couple the fuse 170 to the printed circuit board 60. In the illustrated embodiment, at least a portion of the cell strap 50a and the fuse 170 are positioned within the cut-out 90 of the printed circuit board 60. That is, a width of at least a portion of the connecting part 154 of the cell strap 50a and at least a portion of the fuse 170 is the same or smaller than a width of the cut-out 90 in the printed circuit board 60.

In some aspects, the fuse 170 may generate the majority of heat within the battery pack 14a. Accordingly, to mitigate the heat generation and protect the surrounding components from excessive heat, a heat shield 200 may be coupled to the fuse 170 (e.g., the first surface 182 of the fuse 170). As shown, the heat shield 200 may be positioned between the cell strap 50a (e.g., the connecting part 154 of the cells 40 strap) and the printed circuit board 60. The heat shield 200 may include a width W4 that is substantially the same as the first width W1 of the fuse 170. In the illustrated embodiment, the heat shield 200 may be adhered to the fuse 170 by an adhesive material. Accordingly, the adhesive at least partially secures the heat shield 200 relative to the fuse 170. The heat shield 200 is further constrained relative to the fuse 170 by the first and second sidewalls 70, 74 and the top housing portion 26.

The heat shield 200 may be formed of a ceramic material. In the illustrated embodiment, the heat shield 200 may be formed of a material including silicon. More specifically, in the illustrated embodiment, the heat shield 200 may be formed of silicon carbide (SiC), and includes a heat conductivity that is greater than about 9.0 W/m·K. The value for this aspect may vary within tolerances that would be understood by a person of skill in the art. The heat shield 200 may be formed from other non-metallic (i.e., metal free) materials, such as other ceramics including silicon oxide and aluminum oxide. Accordingly, in the illustrated embodiment, the ceramic heat shield 200 may have a heat conductivity, which is less than the heat conductivity of a heat sink formed from or including metal, ranging from approximately 1 W/m·K to 15 W/m·K. The ceramic heat shield can absorb some heat directly from the fuse, and the heat can be released later (unlike mica sheet, fiberglass, or thin foil). Although the ceramic heat shield 200 absorbs less heat than a heat sink formed from or including metal, the ceramic heat shield 200 generally mitigates heat generation but interferes less with the electronics of the printed circuit board 60 and is less likely to short the fuse 170. The ceramic heat shield permits the fuse 170 to function as a fuse as desired, permitting the fuse 170 to blow when necessary.

Figure 7:
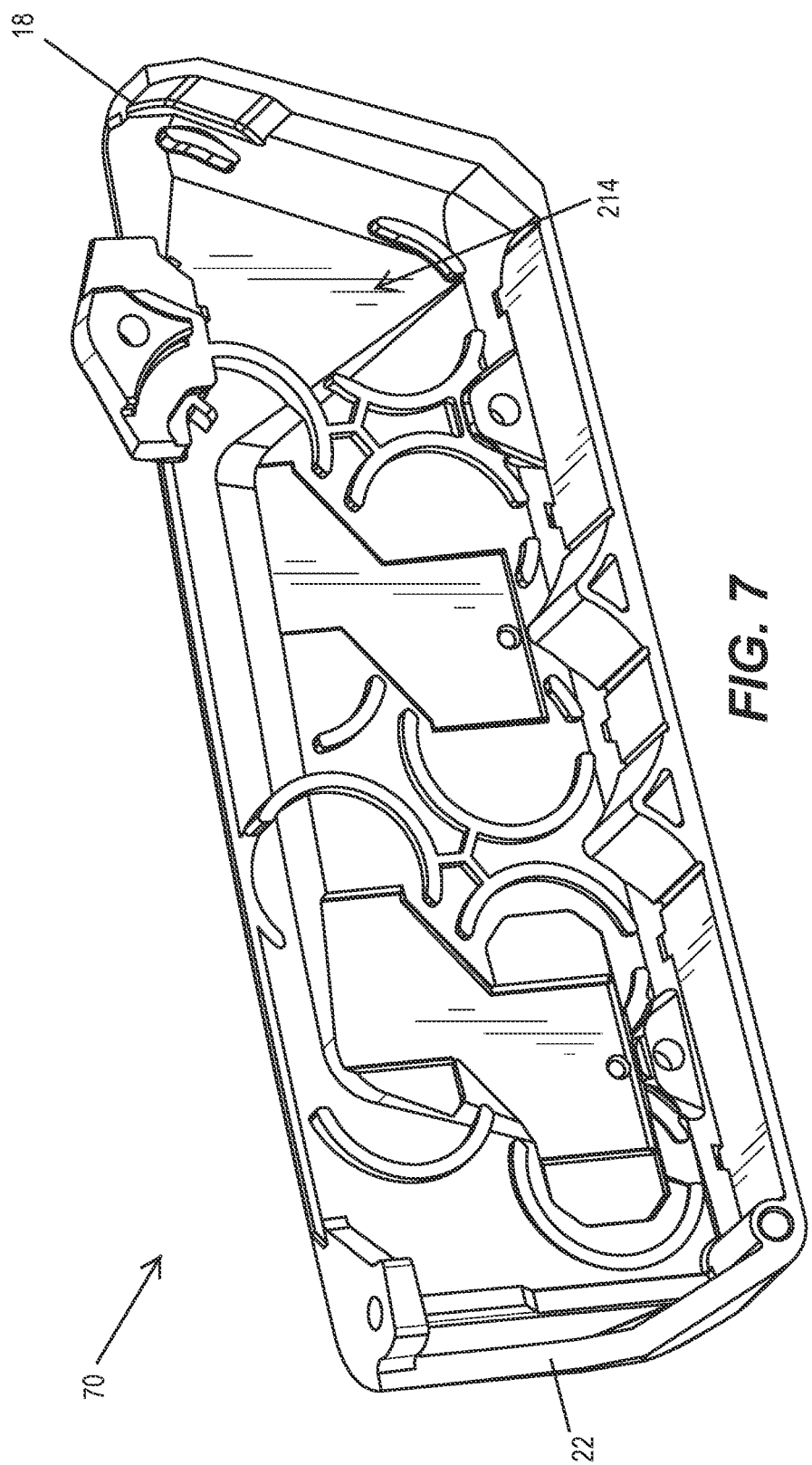
FIG. 7 is perspective view of a sidewall of the housing of the battery pack of FIG. 1.

The battery connection part 150 of the cell strap 154 is also heat generating. Accordingly, a thermally conductive pad 210 is positioned between the battery connection part 150 of the cell strap 50a and the housing (e.g., the first sidewall 70 of the housing). The thermally conductive pad 210 is thermally conductive and is configured to pull heat from the cell strap 50a to the material of the housing. In the illustrated embodiment, the thermally conductive pad 210 is sized and shaped to be received in a complementary recess 214 (FIG. 7) of the first sidewall 70 of the housing. Additionally, the thermally conductive pad 210 may be adhesively coupled to the first sidewall 70. As shown, the complementary recess 214 in the first sidewall 70 of the housing is positioned adjacent to the battery connection part 150 of the cell strap 50a. Accordingly, when the battery pack is assembled, the thermally conductive pad 210 is positioned adjacent the battery connection part 150 of the cell strap 50a. The thermally conductive pad 210 is preferably a silicone pad, although other thermally conductive materials may be used. The thermally conductive pad 210 may have a thermal conductivity of approximately 6 W/m·K and may range from about 1 W/m·K to 15 W/m·K. The value for this aspect may vary within tolerances that would be understood by a person of skill in the art. Additionally, the thermally conductive pad 210 may be structurally stable (e.g., will not melt) at temperatures ranging from −40° C. to 200° C.

Figure 8:
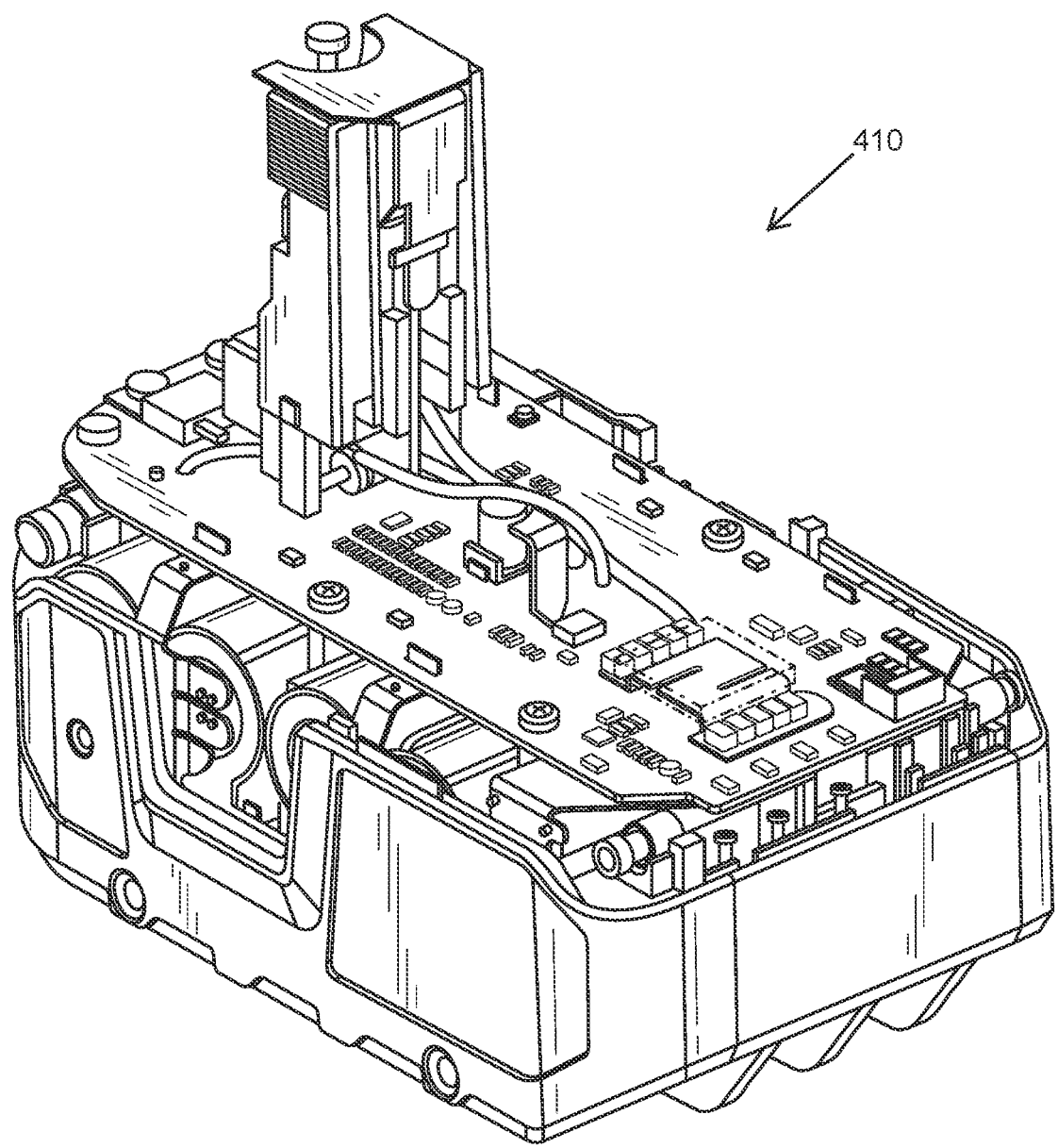
FIG. 8 is a perspective view of a battery pack according to another embodiment.

While the disclosure specifically discusses a slide-type battery pack, the heat mitigating components may additionally or alternatively be incorporated in a tower-style battery pack 410 as shown in FIG. 8.

Thus, the disclosure provides, among other things, heat mitigating features for a battery pack. Although the disclosure has been described in detail with reference to certain embodiments, variations and modifications exist within the scope and spirit of one or more independent aspects as described. Various features and advantages are set forth in the following claims.

What is claimed is:

1. A battery pack comprising:
 a housing;
 a plurality of battery cells;
 a printed circuit board supported within the housing, the printed circuit board electrically coupled to a plurality of electrical terminals configured to mate with a plurality of electrical terminals of a device;
 a cell strap in electrical communication with at least one of the plurality of battery cells, the cell strap in electrical communication with the printed circuit board;
 a fuse coupled to the printed circuit board; and
 a heat shield coupled to the fuse, the heat shield configured to inhibit heat transfer between the fuse and other components of the battery pack.

2. The battery pack of claim 1, wherein the heat shield comprises silicon.

3. The battery pack of claim 1, wherein the heat shield comprises silicon carbide.

4. The battery pack of claim 1, wherein the heat shield is adhered to the fuse by an adhesive material.

5. The battery pack of claim 1, wherein the cell strap includes a battery cell connection part coupled to a terminal of the at least one of the plurality of battery cells, and a coupling part extending from the battery cell connection part, at least a portion of the coupling part directly coupled to at least a portion of the fuse.

6. The battery pack of claim 5, further comprising a thermally conductive pad positioned between the battery cell connection part and the housing.

7. The battery pack of claim 1, wherein the heat shield comprises a ceramic material that is metal free and has a lower heat conductivity than a material including metal.

8. A battery pack comprising:
a housing;
a plurality of battery cells supported within the housing;
a printed circuit board supported within the housing, the printed circuit board electrically coupled to a plurality of electrical terminals configured to mate with a plurality of electrical terminals of a device;
a cell strap in electrical communication with at least one of the plurality of battery cells, the cell strap in electrical communication with the printed circuit board;
a fuse coupled to the printed circuit board;
a heat shield proximate the fuse; and
a thermally conductive pad positioned within the housing.

9. The battery pack of claim 8, wherein the cell strap includes a battery cell connection part coupled to a terminal of the at least one of the plurality of battery cells, and a coupling part extending from the battery cell connection part, at least a portion of the coupling part in direct contact with the fuse.

10. The battery pack of claim 9, wherein the thermally conductive pad is positioned between the battery cell connection part and the housing.

11. The battery pack of claim 8, further comprising an electrically insulating material, the fuse positioned between the electrically insulating material and the heat shield.

12. The battery pack of claim 8, wherein the heat shield is formed from a ceramic material that is metal-free and has a lower heat conductivity than metal.

13. The battery pack of claim 8, wherein the heat shield is formed from silicon.

14. The battery pack of claim 8, wherein the heat shield is formed from silicon carbide.

15. The battery pack of claim 8, wherein the heat shield is adhered to the fuse by an adhesive material.

16. A method of manufacturing a battery pack, the method comprising:
positioning a plurality of battery cells and a printed circuit board within a housing;
coupling a cell strap to at least one of the plurality of cells;
coupling a fuse between the cell strap and the printed circuit board; and
coupling a heat shield to the fuse.

17. The battery pack of claim 16, wherein coupling the heat shield to the fuse includes adhering the heat shield to the fuse with an adhesive material.

18. The battery pack of claim 16, further comprising positioning a thermally conductive pad between the cell strap and the housing.

19. The battery pack of claim 16, further comprising positioning an electrically insulating material adjacent a side of the fuse that is opposite the heat shield.

20. The battery pack of claim 16, wherein the heat shield is formed of a ceramic material that is metal-free and has a lower heat conductivity than metal, the heat shield including silicon.

* * * * *